United States Patent Office 3,337,539
Patented Aug. 22, 1967

3,337,539
TETRAETHOXY-1,2,3,4-TETRAHYDROISOQUINO-
LINE DERIVATIVES AND SALTS THEREOF
Zoltán Mészáros, Péter Szentmiklósi, and Irén Czibula,
Budapest, Hungary, assignors to Chinoin Gyógyszer-és
Vegyészeti Termékek Gyára R.T., Budapest, Hungary
No Drawing. Filed Oct. 10, 1962, Ser. No. 229,722
8 Claims. (Cl. 260—240)

This invention relates to new pharmaceuticals and methods of preparing the same. More particularly it is concerned with new tetrahydroisoquinoline derivatives, which possess spasmolytic, analgetic, vasodilatory or hypotensive properties.

It is known, that several compounds, containing an isoquinoline ring possess spasmolytic properties. It is further known, that 1,2,3,4-tetrahydro-2-methyl-6,7,3',4'-tetraethoxy-1-benzyl isoquinoline may be prepared by hydrogenating 6,7,3',4'-tetraethoxy-1-benzyl-N-methyl-isoquinolinium-iodide in the presence of platinum (Acta Chim. Hungary 1959, 413). This latter substance is described as an unstable base showing a brown colour within a short time of standing.

It has been found, according to the present invention, that compounds of the general formula

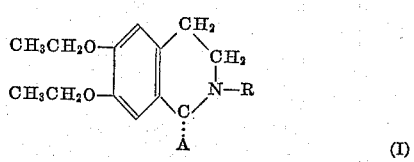

(I)

(where A stands for a 3,4-diethoxy-benzyl-, or for a 3,4-diethoxy-benzal group, while R stands for hydrogen, an alkyl, aralkyl, or aryl group) and their salts are valuable substances which may be applied for medical use, due to their increased spasmolytic properties and their analgetic, vasodilatatory or hypotensive effects. Compounds where R stands for hydrogen or a lower alkyl group, such as methyl, ethyl, propyl, allyl, were found to be of especially good therapeutical effect.

It has been found further, according to the present invention, that compounds of the general Formula I may be prepared by (a) Ring closure of compounds of the general formula

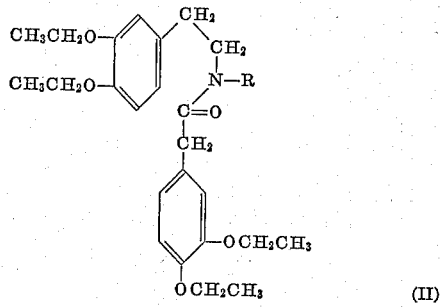

(II)

in presence of a water-binding condensation agent at a temperature below 100° C. preferably in acidic medium (where in the formula R stands for the same as stated above), or (b) Reducing compounds of the formula

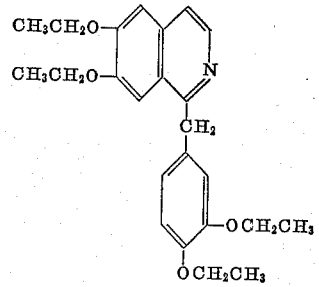

(III)

or its salts, or
(c) Reducing compounds of the formula

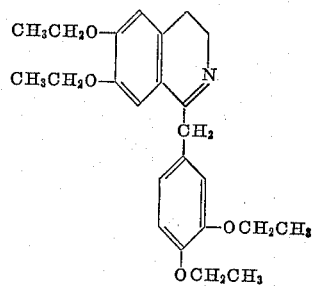

(IV)

(dihydroperparine) or its quaternary salts, or
(d) Reducing compounds of the general formula

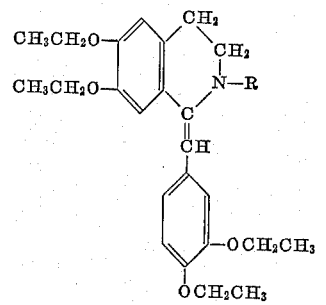

(V)

in an acidic medium (where R stands for the same as stated above), and if desired alkylating or aralkylating the compounds thus obtained in position 2 of the molecule and/or converting the compounds into their salts formed with acids or splitting the salts formed with acids in order to obtain the free base.

When carrying out the method (a) of the process according to the invention, phosphorus oxychloride or phosphorus pentoxide may be used as the condensation agent. It is preferable to carry out the reaction in the presence of an organic solvent, e.g. in benzene or chloroform.

When preparing compounds where in the formula A stands for a 3,4-diethoxy-benzal group, it is preferable to bring about the reaction in acidic medium. One may proceed however by acidifying the reaction mixture after ring closure to obtain the benzal derivative. For isolating the product, one may proceed by adding acid to the reaction mixture and splitting the excess condensation agent (e.g. phosphorus oxychloride) by addition of water, followed by evaporation of the solvent. Another method consists in evaporating the solvent and splitting the excess phosphorus oxychloride by addition of alcohols (e.g. methanol, ethanol, isopropanol, etc.) and acid. Thus, by addition of hydrochloric acid and aqueous ethanol, the hydrochloride of 6,7,3',4' - tetraethoxy-benzal - 1,2,3,4-tetrahydroisoquinoline is obtained in a pure state and in the form of stable crystals. The hydrochloric salt may be converted into further salts formed with different organic or anorganic acids.

When carrying out the method (b) of the process according to the invention, it is preferable to use the salts of the compounds of the Formula III (called "perparine") as starting material. Thus mineral acid salts, e.g. the hydrochloride, sulphate, hydrobromide, etc. may be subjected to reduction. The tetrahydro derivative may be obtained by way of catalytical hydrogenation in presence of palladium as a catalyst. When using this method, a longer reduction period or higher pressure is needed for the reaction. When products are produced where in position 2 of the molecule the nitrogen atom is substituted by an aralkyl group or an alkyl group containing at least 2 carbon atoms, it is preferable to use quaternary salts of the compounds III as starting materials. These salts may be formed by aralkyl, or alkyl halogenides. When using this method, reduction may be accomplished within a short reaction period.

When carrying out the method (c) of the process according to the invention, 6,7,3',4' - tetraethoxy-1-benzyl-3,4-dihydroisoquinoline is subjected to a reductive action in acidic medium. The reduction is brought about preferably by way of catalytic hydrogenation in the presence of palladium, Raney-nickel or a precious metal catalyst. It is preferable to use palladium charcoal and to carry out the reduction at a pressure of 1–16 atm. in the presence of a solvent. It is preferable to use polar solvents for this purpose. However, reduction may be carried out using hydrogen in statu nascendi, e.g. with sodium amalgamate or sodium in alcohol.

When using the method (d) of the process according to the invention, the reaction is carried out as described above when discussing the method (c). As starting material of catalytic hydrogenation it is preferable to use the salt of the compound V.

When preparing compounds substituted at the nitrogen atom with alkyl or aralkyl groupings, reduction is carried out preferably as follows: Compounds of the Formula IV or V (where R stands for hydrogen) are converted into their quaternary salts formed with alkyl or aralkyl halogenides or sulphates whereupon the salts thus obtained are subjected to reduction. Thus the N-methyl, -ethyl, -allyl, -aralkyl or halogenated aralkyl derivatives may be produced. From industrial point of view, the corresponding bromides or chlorides are used with preference for the formation of quaternary salts. Reduction is carried out substantially as described above for the reduction of mineral acid salts formed with compounds III. When using this method e.g. the 6,7,3',4'-tetraethoxy-1-benzyl-2-methyl derivative may be prepared in pure state in form of the stable white crystalline base. This product shows a melting point which was found to be higher than the melting point described previously for the same product. The same increase of the melting point was observed when preparing the hydrochloric salt.

N-alkyl and N-aralkyl derivatives may be prepared from the unsubstituted products by way of known alkylating or aralkylating methods. Thus the tetrahydroisoquinoline derivatives may be reacted with alkyl halogenides or aralkyl halogenides. Substitution may be accomplished by way of reaction with the corresponding aldehyde and simultaneous or subsequent reduction. This latter method may be used with preference for introduction of an alkyl group (e.g. methyl).

According to a preferred form of this method formaldehyde is used and reduction is brought about by catalytic hydrogenation. Aromatic aldehydes may be used for this reaction as well. It is preferable to use palladium as a catalyst.

According to the present invention pharmaceutical compositions are provided, containing as active ingredients at least one tetrahydroisoquinoline derivative of Formula I. Compositions are preferred, which contain compounds of Formula I, where R stands for hydrogen, or a lower alkyl group.

The pharmaceutical compositions may contain additional compounds having themselves pharmaceutical activity. Thus the composition may contain as further active ingredients analgetics, tranquilizers, antiphlogistics, diuretics, spasmolytics, choleretics and vasodilators. Thus e.g. nicotinic acid, citric acid, methyl homatropic bromide, menthol, phenolpthalein, hexamethylene tetramine, bilic acid, codeine, amidazophene, novamidazophene, Reserpine, phenobarbital or N-(3)-phenyl-propyl-(2)-1,1-diphenyl-propyl-(3)-amino-lactate, etc., may figure as additional compounds.

The said pharmaceutical compositions may be in form suitable for oral, rectal or parenteral use. The compositions may contain sweetening, flavouring, colouring and preserving agents. Compositions intended for oral use may be prepared according to any method known to the art for the manufacture of pharmaceutical compositions, such as tablets, dragées, suspensions, solutions, powders or granules, capsules, emulsions, etc. The tablets may contain non-toxic pharmaceutical excipients commonly used in the manufacture of tablets, thus they may contain lubricating, binding, granulating and disintegrating agents, diluents, etc.

Suspensions or solutions may contain the following excipients: suspending agents, dispersing or wetting agents, preservatives, thickening agents, etc. Powders and granules may contain wetting and suspending agents.

The pharmaceutical compositions may be in the form of suppositories. These compositions are prepared by mixing the active compounds with a suitable non-irritating excipient, such as cocoa-butter or polyethylene-glycols.

The pharmaceutical compositions may be in the form of a sterile injectable preparation, such as an aqueous solution or suspension, or in another non-toxic parenterally acceptable diluent or solvent.

The compounds according to the invention or their salts may be used for the treatment of humans preferably in 0.001 to 0.08 g. doses.

Further detatils of the invention are to be found in the examples.

*Example 1*

104 g. of 3,4-diethoxyphenyl-acetyl-3,4-diethoxyphenyl-ethylamide (M.P. 108–109° C.) are boiled in 250 ml. benzene for two hours in the presence of 50 g. of phosphorous oxychloride. On evaporating 200 to 220 ml. of benzene, the yellow residue is covered with 300 ml. of 96 P.C. alcohol and 30 ml. of concentrated hydrochloric acid. The reaction mixture gets warm and is heated gently to its boiling point, whereby the benzene-alcohol solution is partly evaporated. The solution is cooled while stirring and the product precipitates in the form of light yellow glittering crystals which are filtered, washed with alcohol and dried at 70–80° C. 104–105 g. of 6,7,3',4'-tetraethoxy-benzal-1,2,3,4-tetrahydroisoquinoline HCl are obtained. M.P. 206–208° C. On recrystallization in a 2–3-fold volume of alcohol, 96 g. of the product are obtained, melting at 210–212° C.

The hydrobromide (M.P. 200–202° C.) may be prepared similarly. By reacting with potassium iodide, the hydroiodide salt may be prepared from an aqueous solution of the hydrochloride or hydrobromide salt. M.P. 212–214° C.

By reacting with the corresponding salt or an alkali salt of the same the following salts may be prepared in the following table the compound ethyl benzoquinolinyl acetate has the following formula:

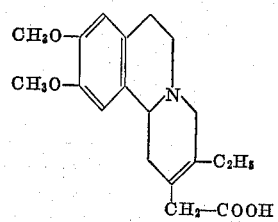

| Salt: | Melting point, ° C. |
|---|---|
| Hydrogen fluoride | 55–69 |
| Nitrate | 98–100 |
| Sulphate | 173–174 |
| Phosphate | 165–168 |
| Rhodanide (salts formed with a compound of the formula HSCN) | 115–160 |
| Acetate | 114–116 |
| Oxalate | 160–161 |
| Tartrate | 130–133 |
| p-Nitrophenyl-lactate | 91–99 |
| p-Phenoxy-benzoate | 112–116 |
| Xanthene-carbonate | 116–119 |
| Dimethoxy phenylacetate | 106–110 |
| Diethoxy phenylacetate | 73–78–85 |
| p-Chlorophenyl propionate | 83–86 |
| Tropanate | 100–103 |
| Mandelate | 80–84–85 |
| Phenoxyacetate | 113 |
| Dimethoxybenzoate | 108–110 |
| Malonate | 140–141 |
| Ethylbenzoquinolinyl-acetate | 117–119 |
| Yatronate (the salts formed with 8-hydroxy - 7 - iodo - quinoline - 5 - sulfonic acid) | 182–184 |

By pharmacological tests of the hydrochloric acid salt, the following results have been obtained: the toxicity amounts to $DL_{50}=19$. mg./kg. if administered intravenously, 95.0 mg./kg. subcutaneously and more than 1000 mg./kg. perorally (on mice).

A strong hypotensive effect was observed by administration of 25 mg./kg. doses into the duodenum of narcotized cats. In the same test perparine proved to be ineffective even in 400 mg./kg. doses. This fact shows, that the resorbtion from the duodenum is considerably better, than in the case of perparine.

The spasmolytic effect was found to be $ED_{50}=0.056$ mg. (perparine 0.108 mg.) according to the method of Example 1. In the presence of cattle blood serum $ED_{50}$ was found to be 0.250 mg., while the same value was found to amount to 0.756 mg. in the case of perparine.

*Example 2*

39.8 g. of 6,7,3',4'-tetraethoxy-1-benzyl-3,4-dihydroisoquinoline are dissolved in 400 ml. of ethanol, 13 ml. of concentrated hydrochloric acid and 8 g. of palladium-charcoal catalyst (containing about 8% of metal) are added and the reaction mixture is hydrated in an autoclave at 5–10 atm., and 50–60° C. for 5–6 hours. After having absorbed the theoretical quantity of gaseous hydrogen, the catalyst is filtered off, the alcoholous solution is evaporated to a volume of 100–120 ml. and the residue is cooled. The crystalline precipitation of the hydrochloric acid salt of tetrahydroperparine takes place in a short time. After some hours of standing, the crystals are filtered, covered with alcohol, filtered under reduced pressure, and dried. Thus 37 g. of 6,7,3',4'-tetraethoxy - 1 - benzyl - 1,2,3,4-tetrahydroisoquinoline hydrochloride are obtained; M.P. 164–166° C. After recrystallization from ethanol or water, snow white tetrahydroperparine hydrochloride is obtained. M.P. 166–168° C.

Crystalline tetrahydroperparine base can be prepared from the above salt, by reacting it with ammonium hydroxide or with an aqueous solution of alkali hydroxide.

By pharmacological tests of the above hydrochloric acid salt the following results have been obtained: $DL_{50}=35.0$ mg/kg. intravenously, 195 mg/kg. subcutaneously, and more than 1350 mg./kg. perorally (on mice).

In comparison with papaverine and perparine it was found, that tetrahydroperparine hydrochloride is absorbed from the intestines considerably better, than the other two compounds. Rat intestines were suspended in Tyrode solution, then spasms were induced by barium chloride, and the doses decreasing the spasm to 50% have been observed. The effective doses in case of spasms induced by 20 mg. of barium chloride in 20 ml. of Tyrode solution were found to be 0.069 mg. in the case of tetrahydroperparine hydrochloride and 0.108 mg. in the case of perparine.

*Example 3*

104 g. of 3,4-diethoxyphenyl-acetyl-3,4-diethoxy-phenyl-ethylamide (M.P. 108–109° C.) are boiled in 250 ml. of benzene for two hours in the presence of 50 g. of phosphorous oxychloride. The mixture of 300 ml. of water and 30 ml. of concentrated hydrochloric acid are added to the reaction mixture and benzene is distilled off while stirring. The remaining light yellow, aqueous solution is filtered warm and chilled. The product precipitates in form of light yellow crystals, which are filtered, washed with a small quantity of water and dried at a temperature between 80–90° C. 110 g. of 6,7,3',4'-tetraethoxy - 1 - benzal - 1,2,3,4 - tetrahydroisoquinoline hydrochloride are obtained. M.P. 202–208° C. After recrystallization from a 2.5 fold volume of water 103 g. of light yellow crystals are obtained. M.P. 211–212° C.

*Example 4*

39.8 g. of dihydroperparine base are dissolved in 150 ml. of acetone at room temperature and the faintly milky solution is filtered on folded filter paper. 30 ml. of an acetenous methyl bromide solution (containing 0.6 g. of methyl bromide/ml.) are added to the filtrate. The light yellow solution thus obtained is set aside for 24 hours at room temperature. Faintly yellow crystals appear in a few hours. After 24 hours the crystals are filtered off, washed with acetone and dried. Thus 40–42 g. of dihydroperparine methobromide are obtained, forming light yellow, glittering crystals. M.P. 174–176° C.

24.6 g. of dihydroperparine methobromide are dissolved in 150 ml. of 96% alcohol and 5 g. of palladium-charcoal catalyst (containing 8% of metal) are added. The reaction mixture is hydrated at 5–10 atm. and 35–40° C. Thus the theoretical quantity of hydrogen is absorbed within 35–40 minutes. The catalyst is filtered, the solution is evaporated to 40–50 ml., and put aside in a refrigerator. Next day the precipitated crystals are filtered, washed with some cold alcohol and dried. Thus 21, 5 g. of N-methyl-tetrahydroperparine hydrobromide are obtained in form of almost colourless crystals. M.P. 145–146° C. Recrystallized from a twofold volume of 96% alcohol 19.5 g. of white crystals are obtained. M.P. 146–147° C.

The base can be set free from the solution of the above salt with ammonium hydroxide, or an aqueous solution of alkali hydroxide. Snow-white crystals are obtained, M.P. 62–64° C. Starting from the base salts can be prepared with various acids. The hydrochloride is readily crystallized and highly soluble in water (a 10 P.C. solution may be prepared at room temperature). One may prepare it preferably by introducing dry gaseous hydrochloric acid into the solution of the base in anhydrous alcohol. M.P. 137–139° C.

*Example 5*

39.6 g. of perparine base (M.P. 101–102° C.) are dissolved in 300 ml. of acetone, while gently heating the solution. 30 ml. of an acetous methyl bromide solution are added (containing 0.63 g. of methylbromide/ml.), the reaction mixture is set aside at room temperature for a day, while it is shaken up from time to time. The perparine methobromide precipitates in form of snow-white crystals. The crystals are filtered, washed with some acetone and dried. Thus 40–42 g. of perparine methobromide are obtained. M.P. 197–199° C.

24.5 g. of perparine methobromide are dissolved in 100 ml. of 96 P.C. alcohol, 5 g. of palladium-charcoal catalyst are added and the reaction mixture is hydrogenated in an autoclave at a pressure of 5–10 atm. The theoretical quantity of hydrogen is absorbed within 8–10 hours at 40–45° C. On filtration of the catalyst, the solution is evaporated to 40–50 ml. and set aside in a refrigerator. Next day the precipitated crystals are filtered, washed with some alcohol and dried. Thus 20.5 g. of N-methyl-tetrahydroperparine hydrobromide are obtained in form of almost colourless crystals. M.P. 145–146° C. After recrystallization from a twofold quantity of alcohol, 18.0 g. of snow-white N-methyl-tetrahydroperparine hydrobromide are obtained. M.P. 146–147° C.

Example 6

80 g. of tetrahydroperparine base (M.P. 90–100° C.) are dissolved in 400 ml. of methanol at a temperature between 28–30° C. 40 ml. of aqueous, 38% formaldehyde solution are added and the reaction mixture is set aside for a day. Then it is hydrated in the presence of 10 g. of palladium-charcoal catalyst in an autoclave at 25–30° C. and 5–10 atm. The theoretical quantity of hydrogen is resorbed in 2–2.5 hours.

The catalyst is filtered, the solution is evaporated to 120–150 ml. and set aside in a refrigerator for a day. Next day the precipitated crystals are filtered, covered with some cold alcohol and dried below 50° C. Thus 75 g. of almost colourless N-methyl-tetrahydroperparine base are obtained. M.P. 59–60° C.

Recrystallized from a 2-fold volume of alcohol snow-white crystals are obtained. M.P. 62–64° C.

In the following examples some pharmaceutical combinations are described, containing the products of Examples 1, 2, and 3, i.e. 6,7,3′,4′-tetraethoxy-1-benzyl-1,2,3,4-tetrahydroisoquinoline hydrochloride (called A in the following part of the specification) and 6,7,3′,4′-tetraethoxy - 1 - benzal - 1,2,3,4 - tetrahydroisoquinoline hydrochloride (called B in the following part of the specification).

Example 7

The components are compounded and finished in form of tablets or dragées according to usual methods. The composition of a tablet is the following:

|   | G. |
|---|---|
| A or B | 0.04 |
| Talcum | 0.01 |
| Amylum solani | 0.08 |
| Lactosum | 0.10 |

Example 8

For injectional purposes the following solution is prepared and ampoules are made therefrom according to usual methods one ampoule containing:

|   | G. |
|---|---|
| A or B | 0.04 |
| Urethane | 0.06 |
| Concentrated alcohol | 0.20 |
| Aqua dest. pro inj., ad., 2.00 ml. | |

Example 9

The following combination, suitable for the treatment of peripheral aortic stenosis is prepared, according to the usual finishing methods:

|   | G. |
|---|---|
| A or B | 0.06 |
| Acidum nicotinicum | 0.0168 |
| Acidum citricum | 0.027 |
| Aqua dest. pro inj. pro ampoule, 2.0 ml. | |

Example 10

The following combination, exhibiting spasmolytic effect, is prepared according to the usual finishing methods:

(a)

|   | G. |
|---|---|
| A or B | 0.04 |
| Methylhomotropinum bromatum | 0.002 |
| Phenobarbital | 0.02 |
| Stearinum | 0.003 |
| Talcum | 0.005 |
| Amylum solani | 0.073 |
| Lactosum pro tablet | 0.087 |

(b)

|   |   |
|---|---|
| A or B | 0.040 |
| Methylhomotropinum bromatum | 0.0015 |
| Aqua dest. pro inj. ad. pro ampoule, 1.0 ml. | |

Example 11

The following combination, serving as a bile-stimulator, is prepared according to the usual finishing methods:

|   | Mg. |
|---|---|
| Methylhomotropinum bromatum | 1 |
| Menthol | 7.5 |
| A or B | 20.0 |
| Phenylpthalein | 20.0 |
| Natrium cholein | 60.0 |
| Hexamethylene tetramine | 80.0 |
| Gelat. alb. | 0.9 |
| Natr. chlor. | 8.1 |
| Stearine | 8.4 |
| Gummi arabicum | 11.0 |
| Bentonite | 15.0 |
| Lactose | 19.0 |
| Amylum solani | 36.3 |
| Talcum | 105.8 |
| Sacchar. pro tablet, 157.0 mg. | |

Example 12

The following composition is suitable to replace morphine in treatment of first caused by bile stone or kidney stone; it is prepared according to the usual finishing methods.

|   | G. |
|---|---|
| Methylhomotropic bromide | 0.0015 |
| Codeine hydrochlor | 0.02 |
| A or B | 0.04 |
| Novamidazophene | 0.30 |
| Acidum hydrochlor. dil. | 0.39 |
| Aqua dest. pro inj. ad. in an ampoule, 1.0 ml. | |

Example 13

The following preparation exhibiting a hypotensive effect, is prepared according to the usual finishing methods:

|   | Mg. |
|---|---|
| Reserpine | 0.1 |
| Hydrochlorothiazide | 10.0 |
| A or B | 20.0 |
| Magn. stearine | 2.0 |
| Gelat. alb. | 2.0 |
| Talcum | 3.0 |
| Amylum solani | 49.0 |
| Lactosum pro tablet, 64.0 mg. | |

Example 14

The following composition is suitable for the elimination of menstruating spasms. It is prepared according to the usual finishing methods:

|  | G. |
|---|---|
| Atrop. methylen, nitr. | 0.0005 |
| Codeine bas. | 0.0116 |
| Phenobarbital | 0.0328 |
| A or B | 0.4000 |
| Amidazophene | 0.2000 |

Butyr. cacao pro suppository, 2.000 g.

Example 15

For the treatment of peripheral vasoconstriction, the following compositions are prepared:

|  | G. |
|---|---|
| A or B | 0.078 |
| Nicotinic acid | 0.022 |
| Stearine | 0.005 |
| Talcum | 0.005 |
| Amylum solani | 0.02 |

Lactose per tablet, 0.07 g.

Example 16

The following composition is suitable for the treatment of anginal diseases and post-infarction states:

|  | G. |
|---|---|
| A or B | 0.04 |
| N - (3)-phenyl-propyl-(2)-1,1-diphenylpropyl-(3)-aminolactate | 0.015 |
| Stearine | 0.005 |
| Talcum | 0.010 |
| Amylum solani | 0.02 |

Lactose per coated pill, 0.07 g.

What we claim is:

1. A composition of matter selected from the group consisting of:

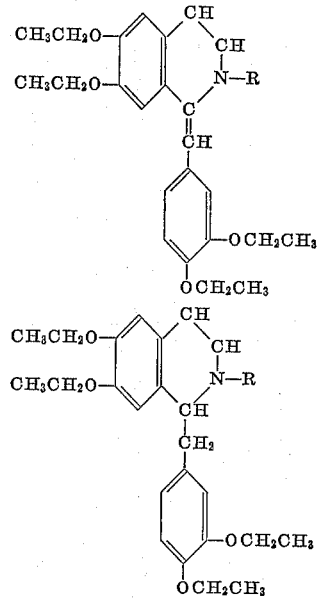

wherein R in the above formulae is selected from the group consisting of hydrogen and methyl and pharmaceutically acceptable salts thereof.

2. The composition of matter of claim 1 wherein said composition is 6,7,3',4' - tetraethoxy - benzal-1,2,3,4-tetrahydroisoquinoline.

3. The composition of matter of claim 1 wherein said salt is selected from the group consisting of hydrochloride salts, hydroiodide salts, hydrobromide salts, nitrate salts, sulphate salts, phosphate salts, HSCN salts, acetate salts, oxalate salts, tartarate salts, p-nitrophenyl-lactate salts, o-phenoxy-benzoate salts, xanthene carbonate salts, dimethoxy - phenyl - acetate salts, diethoxy-phenyl-acetate salts, p-chlorophenyl-propionate salts, tropanate salts, mandelate salts, phenoxy-acetate salts, dimethoxy-benzoate salts, malonate salts, 8-hydroxy-7-iodo-quinoline-5-sulfonic acid salts, and methobromide salts.

4. The composition of matter of claim 1 wherein said composition is 6,7,3',4'-tetraethoxy-1-benzyl-1,2,3,4-tetrahydroisoquinoline.

5. The composition of matter of claim 1 wherein said composition is 6,7,3',4'-tetraethoxy-1-benzyl-1,2,3,4-tetrahydroisoquinoline hydrochloride.

6. The composition of matter according to claim 1 wherein said composition is 6,7,3',4'-tetraethoxy-1-benzyl-2-methyl-1,2,3,4-tetrahydroiosoquinoline.

7. The composition of matter according to claim 1 wherein said composition is selected from the group consisting of 6,7,3',4'-tetraethoxy-1-benzyl-2-methyl-1,2,3,4-tetrahydroisoquinoline hydrochloride.

8. The composition of matter according to claim 1 wherein said composition is 6,7,3',4'-tetraethoxy-1-benzyl-2-methyl-1,2,3,4-tetrahydroisoquinoline hydrobromide.

References Cited

UNITED STATES PATENTS

| 2,464,004 | 3/1949 | Stokesberry | 260—286 |
| 2,634,272 | 4/1953 | Hellerbach | 260—289 X |
| 2,719,150 | 9/1955 | Hellerbach | 260—289 X |
| 2,728,769 | 12/1955 | Shepard | 260—286 |
| 3,020,202 | 2/1962 | Seay | 167—65 |
| 3,063,902 | 11/1962 | Gray | 167—65 |

FOREIGN PATENTS

| 621,917 | 9/1962 | Belgium. |
| 150,535 | 9/1963 | Hungary. |

OTHER REFERENCES

Elderfield: "Heterocyclic Compounds, vol. 4," Wiley, 1953, pages 282–5 relied upon.

Merck Index, 5th edition, 1952, pages 334 and 718.

ALEX MAZEL, *Primary Examiner.*

FRANK CACCIAPAGLIA, Jr., HENRY R. JILES, *Examiners.*

P. L. SABATINE, D. G. DAUS, *Assistant Examiners.*